United States Patent

Taira et al.

[11] Patent Number: 5,809,003
[45] Date of Patent: Sep. 15, 1998

[54] OPTICAL DISK AND OPTICAL INFORMATION REPRODUCING APPARATUS

[75] Inventors: Kozo Taira, Tokyo; Toshiyuki Nakano, Yokohama; Masaaki Matsumaru, Funabashi; Yasuo Motegi, Yokohama, all of Japan

[73] Assignee: Kabushiki Kaisha Toshiba, Kawasaki, Japan

[21] Appl. No.: 916,911

[22] Filed: Aug. 11, 1997

Related U.S. Application Data

[63] Continuation of Ser. No. 623,933, Mar. 28, 1996, abandoned.

[30] Foreign Application Priority Data

Mar. 29, 1995 [JP] Japan ................................ 7-071998

[51] Int. Cl.$^6$ ........................................................ G11B 7/24
[52] U.S. Cl. ............................... 369/275.1; 369/288
[58] Field of Search ............................. 369/275.1, 275.2, 369/275.3, 283, 13, 288, 275.5, 282, 286; 428/64.1, 64.2, 694 SC

[56] References Cited

U.S. PATENT DOCUMENTS

| 5,503,889 | 4/1996 | Imataki ................................ 428/64.1 |
| 5,509,991 | 4/1996 | Choi .................................... 156/245 |

*Primary Examiner*—Ali Neyzari
*Attorney, Agent, or Firm*—Cushman Darby & Cushman IP Group of Pillsbury Madison & Sutro LLP

[57] ABSTRACT

An optical disk has first and second substrates, at least one of which is provided with optically readable pits corresponding to record data, and a reflection film coated on the pits. In the optical disk, the first and second substrates are laminated on each other such that the surface on which the pits are formed, is located inside. Label information, indicative of the record data, is formed on at least one of the surfaces of the first and second substrates, which contact each other.

30 Claims, 4 Drawing Sheets

OPTICAL DISK AND OPTICAL INFORMATION REPRODUCING APPARATUS

This is a continuation of application Ser. No. 08/623,933, filed on Mar. 28, 1996, which was abandoned upon the filing hereof.

BACKGROUND OF THE INVENTION

1. Field of the Invention

This invention relates to a double-layered type optical disk.

2. Description of the Related Art

Optical disks have recently been used as large-capacity information storage media in various industrial fields. A large number of plates can be produced by injection molding using a stamper, which is formed by metallizing processing from a master plate with information recorded thereon in the form of small pits of different lengths and sizes. In general, a reflection film and a protection film for protecting the reflection film are formed on an information-provided surface of each plate. Information is read by radiating the information-provided surface with a laser beam. Further, the plate has a label put thereon for indicating the information stored therein. In the case of a compact disk (CD), for example, a label is printed on the protection film in a screen process.

In order to further increase the recording density and the capacity of each optical disk, a technique for, for example, laminating plates of ½ the thickness of the compact disk on each other is proposed. Since in this technique, two plates are laminated, the mechanical strength and the capacity of the disk are doubled. Moreover, since each plate is thin, the optical characteristics for reading information are enhanced, which is advantageous because it increases the potential recording density.

However, if data is recorded on both surfaces of the optical disk, label information cannot be printed on the optical disk like the conventional singleplate CD, and hence the contents of the disk cannot be recognized with the eyes from the outside.

In the case of an optical video disk (LV), for example, there is a method for attaching a label to a radially inner circumference portion of the disk. It is highly possible, that deviation will occur due to disk clamping.

In addition, in a case where a label is put not on an optical disk itself but on a case for containing the disk, it is necessary to manage the disk and the case such that they are combined with each other at all times. This too is very troublesome.

In summary, in the double-layered type optical disk, the difficulty is how the contents of the disk are recognized.

SUMMARY OF THE INVENTION

It is the object of the present invention to provide a double-layered type optical disk which can display label information indicative of the contents stored in the disk, without degrading the optical/mechanical characteristics of the disk.

According to a first aspect of the invention, there is provided an optical disk comprising: first and second substrates, at least one of which is provided with optically readable pits corresponding to the information recorded, and a reflection film coated on the pits, wherein the first and second substrates are laminated on each other such that a surface of one of the first and second substrates, on which the pits are formed, is located inside, and label information indicative of the record data is formed on at least one of those surfaces of the first and second substrates, which contact each other.

According to a second aspect of the invention, there is provided an optical disk comprising: a first substrate provided with optically readable pits corresponding to record data, and a reflection film coated on the pits; and a second substrate provided with label information indicative of the record data, wherein the first and second substrates are laminated on each other such that the pit-side of the first substrate faces the label-information-side of the second substrate.

Preferably, the optical disks of the invention further have the following features (1)–(7):

(1) A predetermined area in the reflection film formed on the at least one of the first and second substrates serves as a label information area.

(2) The label information area is located around an area in which the pits corresponding to the record data are formed.

(3) The label information formed in the label information area consists of one of a pit pattern and a groove pattern.

(4) The reflection film has a high reflectance to a light beam for reproducing data, and a low reflectance to other visible light beams.

(5) The label information is one of information directly printed in ink on the at least one of the first and second substrates, and information directly printed or formed on at least one of the first and second substrates and inserted between the first and second substrates.

(6) The reflection film is a translucent film.

(7) The label information is formed on a translucent film.

According to a third aspect of the invention, there is provided an optical information reproducing apparatus comprising: an optical disk of the first aspect; means for reading information from the optical disk; and data decoder means for decoding the read information.

In the above-described optical disk constituted by two substrates laminated on each other, label information indicative of record data is formed between the two substrates.

Since where the overall record areas of the optical disk is not full of data, the reflection film is not necessary in an area in which no pits are formed, the label information can be seen through the area with no reflection film.

Further, the reflection film formed on at least one of the substrates is made translucent so as to permit light to reflect thereon at the time of optically reading pits, and to permit light to pass therethrough at the time of making the label information seen from the outside of the disk. As a result, the pits (data) can be optically read from a side of the disk, and the label information can be seen from the same side.

Since as described above, the label information is displayed in the optical disk, the data stored in the disk can be recognized from the disk itself without a case or the like.

In addition, forming the label information between disk substrates can provide an optical disk of excellent mechanical/optical characteristics. Since the label information is not exposed to the outside but protected by the disk substrates, it will not suffer mechanical damage.

Displaying the label information on an outer circumference portion of a disk substrate contributes to producing an optical disk of good design whose contents are easy to recognize.

Constituting the label information by pits or grooves formed in a disk substrate contributes to a fine appearance because of diffraction of light, which is commercially advantageous.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENTS

The embodiments of the invention will be explained with reference to the accompanying drawings.

Figure 1:
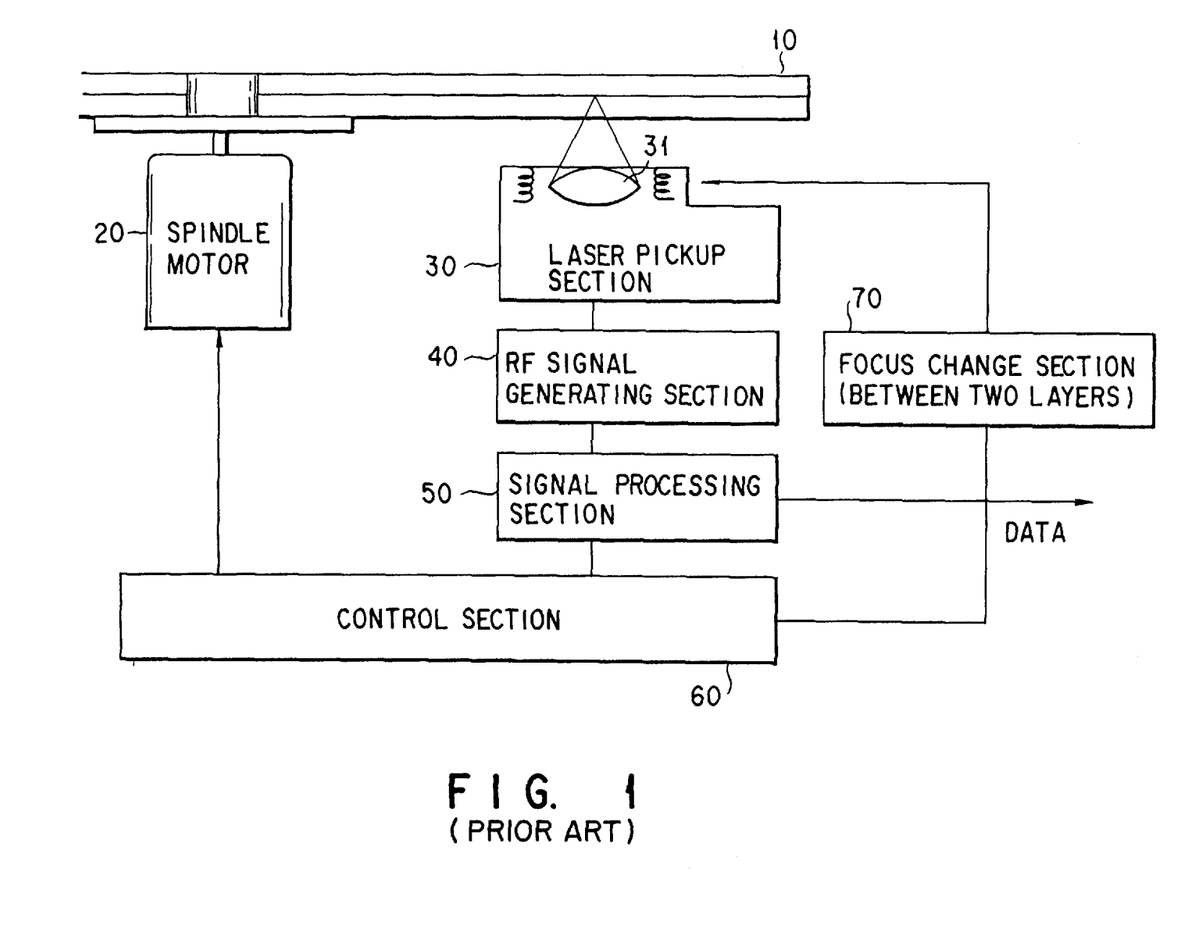
FIG. 1 is a schematic block diagram, showing an optical information reproducing apparatus used to reproduce an optical disk.

FIG. 1 is a schematic block diagram, showing an optical information reproducing apparatus used to reproduce an optical disk.

The optical information reproducing apparatus comprises an optical disk 10, a spindle motor 20, a laser pickup section 30, an RF signal generating section 40, a signal processing section 50, a control section 60 and a focus change section 70 (for two layers).

The operation of the optical information reproducing apparatus constructed as above will be explained.

The optical disk 10 consists of two disk substrates, which are laminated on each other as explained later. The optical disk 10 is rotated by the spindle motor 20 at a predetermined rotational speed. The laser pickup section 30 receives a light beam reflected from the optical disk 10 while the disk rotates at the predetermined rotational speed, and transmits an optical signal indicative of the light beam to the RF signal generating section 40. The RF signal generating section 40 converts the input optical signal to an electric signal, and outputs the electric signal to the signal processing section 50. The signal processing section 50 converts the input RF signal to data, and outputs the data to an output device (not shown), etc. The control section 60 controls the rotational speed of the spindle motor 20 on the basis of the data generated by the signal processing section 50. The control section 60 further controls the focus change section 70. Where two reflective layers (information layers) are formed from which information can be read from one side of the optical disk 10, the focus change section 70 changes the focus of the laser pickup section 30 so as to read information recorded on each of the two reflective layers. If there is only a single reflective layer on one side, the focus change section 70 is not necessary.

Optical information stored in the optical disk 10 is read and reproduced by means of the above-described optical information reproducing apparatus.

The present invention is characterized by the optical disk (hereinafter referred to simply as "disk"). More specifically, the disk of the present invention is characterized in that it consists of laminated two disk substrates, each of which can record information thereon, and in that label information in the form of a character, a figure, etc., is displayed on that surface of a substrate which is adhered to the other substrate. Further, the label information must be easily recognized with the eyes from the outside of the disk.

To enable the label information to be seen from the outside of the disk, measures should be taken in accordance with the amounts of information recorded in the disk.

Specifically, the following cases must be considered:
(1) Where no information is recorded on the overall one surface of the disk (the overall one surface is blank);
(2) Where an outer circumference portion of one surface of the disk has no information (the outer circumference portion is a blank recording area); and
(3) Where information is recorded in the overall recording areas of both surfaces of the disk.

In the cases (1) and (2), label information can be seen from the outside of the disk by removing the reflection film located in the blank recording area, and forming a character or a figure on that portion inside the disk which is aligned with the blank recording area.

In the case (3), it is necessary to permit data to be reproduced from one side of the disk, and at the same time to permit label information to be seen from the same side. To this end, the reflection film on that side is formed such that it reflects a light beam for reproducing data and passes a light beam for permitting a character or a figure (label information) drawn inside the disk to be seen with the eyes from the outside of the disk.

A specific example of the case (1) will be explained in a first embodiment, specific examples of the case (2) in second and third embodiments, and a specific example of the case (3) in a fourth embodiment.

Since in the present invention, label information is formed between the two disk substrates, the label information will not influence the appearance and mechanical characteristics of the disk. Further, since in this structure, the label information is protected by the laminated disk substrates, it will not be damaged, by a scratch or otherwise.

The label information is directly marked on a master plate or on a stamper, with the result that it is recorded on a duplicate plate in the form of depressions and projections, which can be seen with the eyes as a character, a figure, etc.

In a case of directly marking on the master plate, such as a character or a figure, which can be recognized by eye, are recorded on pits or grooves.

As regards the stamper, a character or a figure is directly marked thereon by mechanical means or a laser beam. Since the label information is thus formed at the time of injection-molding a disk, no particular labeling process is necessary, and the overall process is simplified.

In particular, where both surfaces of a single disk are not full of data, at least an outer circumference portion of one surface of the disk is blank. If label information is recorded on the blank portion, it can easily be recognized and the disk can have a good design.

As explained above, it is not necessary to directly form label information on a disk substrate. For example, the label information may be printed in ink on the substrate, or information-printed matter is inserted between the disk substrates. If pits or grooves are formed in that portion of the disk on which label information in the form of depressions and/or projections is not provided, a character or a figure can have a commercially advantageous appearance because of diffraction of light when the label information is printed in ink, or if a printed matter is inserted. In this case, it is preferable the ink and printed matter is with high reflectance for visible light.

Even where both surfaces of the disk are full of data, label information can be included in the disk, since an inner circumference portion is a clamping area with no data and hence can store the label information. However, a method for printing label information on the top surface of the disk or attaching a label thereto may well cause significant deviation. To avoid this, it is advantageous to provide the label information between the two disk substrates.

In order to prevent the label information from adversely affecting the mechanical characteristics of the disk even after the two disk substrates are adhered to each other, the label information is recorded on one of the substrates in the form of depressions and projections, or a printed matter is inserted between the substrates. If the label information is printed in ink on the disk, the adhered disk substrates may be warped because of the thickness of coated ink. This, however, can be avoided by coating a protection film after printing.

Optical disks according to the embodiments of the invention will be explained below. In the embodiments, like element is denoted by like reference numeral, and a duplicate explanation will be omitted.

First Embodiment

Figure 2:
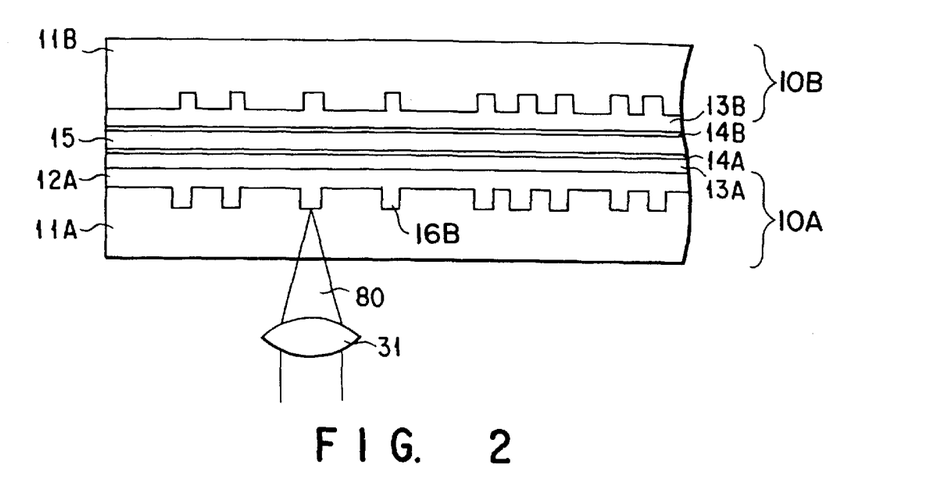
FIG. 2 is a sectional view, showing a laminated type optical disk according to a first embodiment of the invention.

FIG. 2 is a sectional view, showing a first embodiment of the invention.

This embodiment employs a first disk 10A and a second disk 10B. The first disk 10A consists of a resin substrate 11A with an outer diameter of 120 mm and a thickness of 0.6 mm, which has one surface provided with bits 16B corresponding to recorded data such as image data; a reflection film 12A coated on the one surface of the plate 11A; and a protection film 13A coated on the reflection film 12A. The second disk 10B consists of a resin substrate 11B similar to the resin substrate 11A and having pits formed on one surface thereof; and a protection film 13B.

The reflection film 12A can be formed of an Al thin film, and the protection films 13A and 13B can be formed of a film which will harden when radiated with ultraviolet light. As regards the two resin substrates 11A and 11B, it is advantageous in mass production to form them using, for example, the same stamper. However, these resin substrates may be formed in different manners. It is a matter of course that the second disk 10B may have a resin substrate with no pits.

A sheet 15 is a thin sheet formed, for example, of paper, and has a surface with label information printed thereon and labeling image data stored in the disk. It is not necessary to form the sheet 15 of paper, but it suffices if the label information can be printed thereon. Desirably, the sheet 15 has a uniform and thin thickness of 50 $\mu$m or less.

Adhesive layers 14A and 14B are adhered to the protection films 13A and 13B, respectively, after preparing the first disk 10A, the second disk 10B and the sheet 15 as described above. In a state in which the first and second disks 10A and 10B are opposed to each other such that their surfaces with pits face each other, the sheet 15 is inserted between the disk 10A and 10B so that the label information can be read from the side of the plate 11B with no reflection film. These disks are laminated on each other.

In the above-described structure, from the side of the first disk 10A, image data can be read as reproduction light 80 reflected from each pit and passing the resin substrate 11A and an objective lens 31. From the side of the second disk 10B, the label information printed on the sheet 15 can be seen with the eyes through the resin substrate 11B.

Instead of inserting the sheet 15, the label information may be directly printed on one of the disk substrates. In this case, it is preferable to further coat a protection film on the one disk substrate after printing and then to laminate the disks, since deviation of the disks, etc., can be prevented by the protection film.

Second Embodiment

In the first embodiment, data is recorded on only one surface. On the other hand, a second embodiment is directed to a case where data is recorded on both surfaces, and not all areas of the surfaces are full of data.

Figure 3:
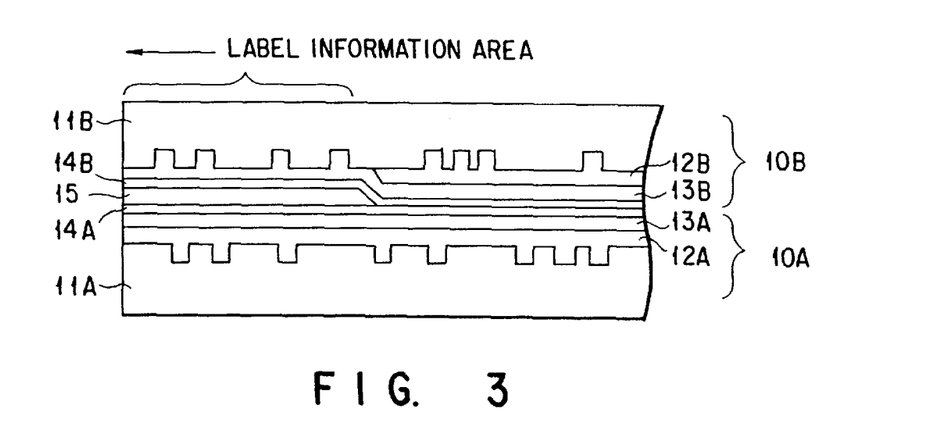
FIG. 3 is a sectional view, showing a double-layered type optical disk according to a second embodiment the invention.

FIG. 3 is a sectional view, showing a disk according to the second embodiment.

In this embodiment, the first disk 10A consists of a resin substrate 11A with an outer diameter of 120 mm and a thickness of 0.6 mm, which has one surface provided with bits 16B corresponding to recorded data such as image data; a reflection film 12A coated on the one surface of the plate 11A; and a protection film 13A coated on the reflection film 12A.

On the other hand, the second disk 10B consists of a resin substrate 11B similar to the resin substrate 11A and having pits which correspond to record data and are formed on a portion of the plate; a reflection film 12B coated on the portion of the plate 11B on which the pits are formed; and a protection film 13B coated on the resultant structure. In other words, the reflection film 12B is not coated, with the use of a mask, on that outer circumference blank portion of the plate 11B on which no pits are formed.

In the second embodiment, the sheet 15 is shaped like a doughnut so as to correspond to the portion of the second disk 10B which is coated with no reflection film 12B, and has label information printed on one surface thereof and labeling image data.

Adhesive layers 14A and 14B are adhered to the protection films 13A and 13B, respectively. In a state in which the first and second disks 10A and 10B are opposed to each other such that their surfaces with pits face each other, the donut-shaped sheet 15 is inserted between the disks 10A and 10B so that the label information can be read from the side of the plate 11B with no reflection film. These disks 10A and 10B are laminated on each other as shown in FIG. 3.

Where the resin substrates 11A and 11B and the sheet 15 are laminated on each other, the label information printed in the donut-shaped sheet can be seen through the outer circumference portion of the resin substrate 11B corresponding to the donut-shaped area and having no data.

Third Embodiment

Like the second embodiment, a third embodiment is directed to a case where data are recorded on both surfaces, and not all areas of the surfaces are full of data.

In this case, however, label information is provided by forming pits or grooves in an area in which no data is recorded beforehand. This differs from the second embodiment wherein the donut-shaped sheet with label information printed thereon is inserted between the disks.

Figure 4:
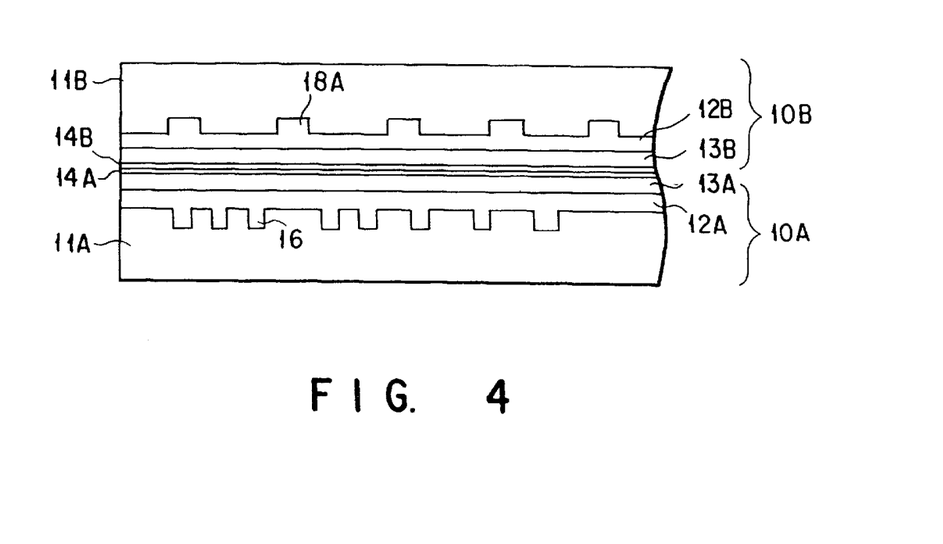
FIG. 4 is a sectional view, showing a double-layered type optical disk according to a third embodiment of the invention.
Figure 5A:
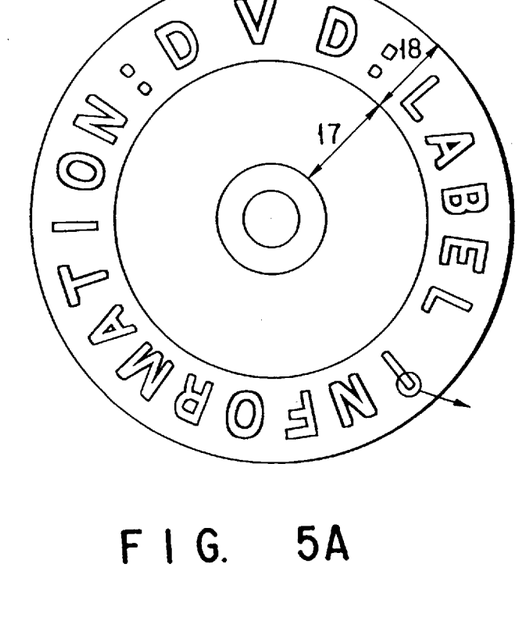
FIG. 5A is a plan view, showing the optical disk of FIG. 4.

FIG. 4 is a sectional view, showing a disk according to the third embodiment. FIG. 5A is a plan view of the disk.

Also in this embodiment, the first disk 10A consists of a resin substrate 11A with an outer diameter of 120 mm and a thickness of 0.6 mm, which has one surface provided with bits 16B corresponding to recorded data such as image data; a reflection film 12A coated on the one surface of the plate 11A; and a protection film 13A coated on the reflection film 12A.

The second disk 10B has basically the same structure as the first disk 10A.

The structure shown in FIG. 4 is obtained by adhering adhesive layers 14A and 14B to the protection films 13A and 13B of the disks 10A and 10B, respectively, and laminating the disks 10A and 10B on each other.

In this embodiment, pits 16 corresponding to record data are formed in the overall surface of the resin substrate 11A. On the other hand, in the resin substrate 11B, grooves 18A indicative of label information is formed in an outer circumference portion thereof, as well as pits 16 corresponding to record data.

In the above-described structure, the disk has an information recording area 17 and an outer circumference label information area 18 in the second disk 10B, as is shown in FIG. 5A. The sizes of the areas 17 and 18 are changed in accordance with the amount of record data in the area 17.

Figure 5B:
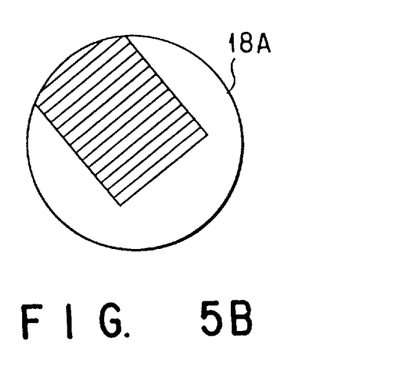
FIG. 5B. is an enlarged view, showing a label information portion.

FIG. 5B is an enlarged view, useful in explaining part of the label information. Character information which can be recognized by the eyes of a person is formed of grooves 18A with a width of 0.4 $\mu$m and a track pitch of 1.6 $\mu$m.

Alternatively, character information of the label information may be provided by forming pits or grooves in portions other than those wherein the character information is to be provided.

As explained above, the third embodiment is advantageous in mass production since it does not require any particular manufacturing process except for the disk lamination process, to include label information in a disk.

Moreover, in the embodiment, characters included in the label information shine in prismatic colors because of diffraction of light, which is commercially advantageous.

Fourth Embodiment

In the first through third embodiments, label information is displayed in a blank area wherein no data are recorded. In a fourth embodiment, label information is displayed while all record areas of both inner surfaces of the disk substrates are full of data.

Where all record areas of both inner surfaces of the disk substrates are full of data, a translucent reflection film is used. Data printed in ink on one of the inner surfaces, or a data-printed matter inserted between the disk substrates can be seen through the translucent reflection film. Since in this case, the reproduction amplitude of recorded data must be prevented from being changed by the label information, it is requested that the translucent reflection film be made to show a sufficiently high reflectance to reproduction light and a sufficiently low reflectance to light to be applied to the label information. The film which meets the request enables a person to see the label information through each of the data recorded surfaces.

Figure 6:
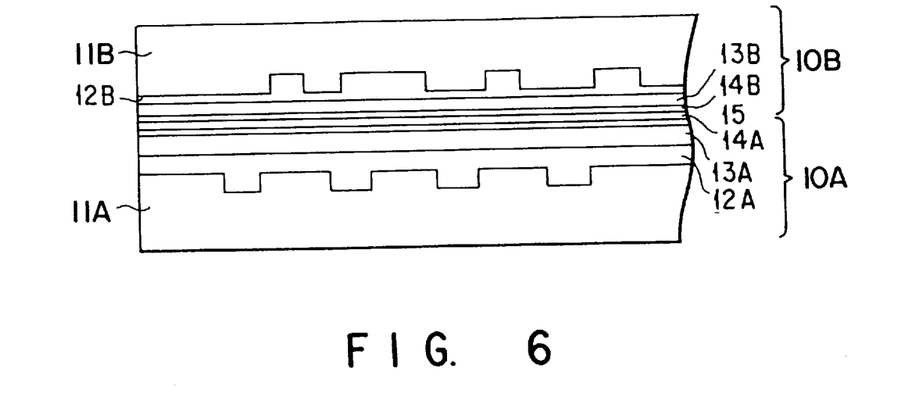
FIG. 6 is a sectional view, showing a double-layered type optical disk according to a fourth embodiment of the invention.

FIG. 6 shows the disk according to the fourth embodiment.

In the fourth embodiment, the first disk 10A consists of a resin substrate 11A with an outer diameter of 120 mm and a thickness of 0.6 mm, which has one surface provided with bits corresponding to recorded data such as image data; a reflection film 12A coated on the one surface of the plate 11A; and a protection film 13A coated on the reflection film 12A. The second disk 10B consists of a resin substrate 11B similar to the resin substrate 11A and having one surface provided with bits corresponding to recorded data such as image data; a reflection film 12B coated on the one surface of the plate 11B and having properties as will be explained later; and a protection film 13B coated on the reflection film 12B.

Adhesive layers 14A and 14B are adhered to the protection films 13A and 13B, respectively. In a state in which the disks are opposed to each other such that their surfaces with pits face each other, the sheet 15 is inserted between the disks 10A and 10B so that the label information can be read from the side of the plate 11B with the reflection film 12B. These disks are laminated on each other.

In this embodiment, a film which has the properties that it reflects light for reproducing data, and passes light for reading the label information formed on one of the inner surfaces of the disk substrates is used as the reflection film 12B.

For example, where red light is used to reproduce data, the reflection film 12B coated on the resin substrate 11B is made of gold and set to a thickness of 0.03 $\mu$m. As a result, label information 15 formed between the disk substrates can be seen.

In other words, since gold shows a high reflectance to red light which has a long wavelength among visible light components, the gold film with the thickness of 0.03 $\mu$m reflects red light, and passes blue light. Accordingly, the label information 15 can be seen with the eyes.

It is a matter of course that the reflection film is not necessarily made of gold but must be translucent. Furthermore, it is preferable to optimize the spectral characteristics of the reflection film by means of the wavelength of a reproduction signal.

Although in the above-described embodiments, label information is displayed on only one of the inner surfaces of disks, it may be displayed on both the inner surfaces by providing the reflection films 12 on both the disks and printing label information on both the surfaces of the sheet 15 so as to be seen through the reflection films.

Figure 7:
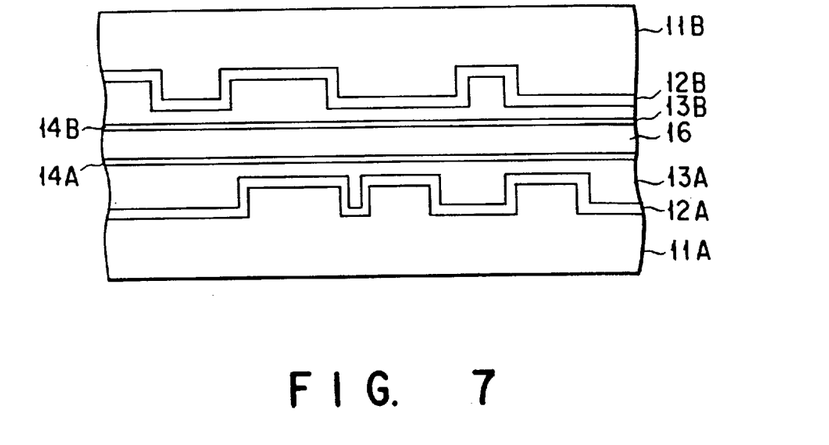
FIG. 7 is a view, showing a modification of the fourth embodiment.
Figure 8:
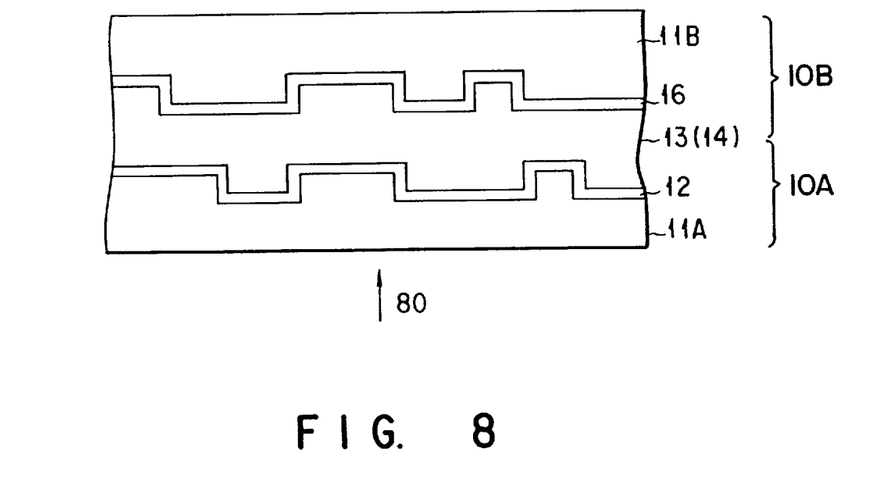
FIG. 8 is a view, showing another modification of the fourth embodiment.

FIGS. 7 and 8 show modifications of the fourth embodiment.

FIG. 7 shows a structure wherein label information can be seen from both sides of a disk which stores data in the inner surfaces of disks thereof.

In FIG. 7, the reflection films 12A and 12B are both translucent films so as to permit the label information to be seen therethrough.

FIG. 8 shows an example of a disk structure wherein label information is to be seen from the side 80 of a plate 11A. In this case, the first disk 10A has the plate 11A provided with a reflection film 12 and a protection film 13, while the second disk 10B has a plate 11B provided at least with label information. The first and second plates 11A and 11B are laminated on each other such that the reflection film-formed surface faces the label information-provided surface.

In this modification, in order to permit the label information to be seen from the side of the plate 11A, a translucent film is used as the reflection film 12, and the label information is displayed on a total reflection film. The translucent film is made of the same material as employed in the fourth embodiment.

This structure can reduce the amount of warp in the disk, as compared with a structure in which label information is displayed on the outside surface of the disk.

In the FIG. 8 structure, the label information 16 may be displayed on a translucent film, and the reflection film be formed of a total reflection film.

Furthermore, the invention is not limited to the above-described embodiments, but may be modified in various manners without departing from the scope thereof.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An optical disk comprising:
   first and second substrates wherein optically readable pits are formed on at least a portion of at least one of the first and second substrates in a first region, the first and second substrates being laminated on each other such that the readable pits are located inside;
   a reflective layer formed on the readable pits only in the first region; and
   label information material provided in an area different from the first region.

2. The optical disk according to claim 1, wherein the label information material is formed directly on at least one of the substrates.

3. The optical disk according to claim 1, wherein the label information material is printed directly on at least one of the substrates.

4. The optical disk according to claim 1, wherein the reflective layer is a reflective film and the label information is formed on the reflective film and the film is inserted between the first and second substrates.

5. The optical disk according to claim 1, wherein the reflective layer is a reflective film and the label information is printed on the reflective film and the film is inserted between the first and second substrates.

6. The optical disk according to claim 1, wherein said label information material is located in an annular area radially outward from the first region.

7. The optical disk according to claim 1, wherein the reflective layer is highly reflective to a light beam for reproducing data and has a low reflectance to other visible light beams.

8. An optical disk comprising:
   first and second substrates wherein optically readable pits are formed on at least a portion of at least one of the first and second substrates, the first and second substrates being laminated on each other such that the readable pits are located inside;
   a reflective layer including a translucent film formed on the readable pits; and
   label information material provided on the translucent film.

9. The optical disk according to claim 8, wherein the label information material is formed on the translucent film.

10. The optical disk according to claim 8, wherein the label information material is printed on the translucent film.

11. The optical disk according to claim 8, wherein the label material is formed on the translucent film and inserted between the first and second substrates.

12. The optical disk according to claim 8, wherein the label material is printed on the translucent film and inserted between the first and second substrates.

13. An optical disk comprising:
   first and second substrates wherein optically readable pits are formed on at least a portion of at least one of the first and second substrates, the first and second substrates being laminated on each other such that the readable pits are located inside;
   a reflective layer formed on the readable pits; and
   label information material formed by a pit pattern or a groove pattern on at least one of the first and second substrates.

14. The optical disk according to claim 13, wherein the reflective layer includes a translucent film.

15. The optical disk according to claim 13, wherein the label information is located in an annular area radially outward from the area in which said readable pits are formed.

16. An optical information reproducing apparatus comprising:
   an optical disk comprising:
      first and second substrates wherein optically readable pits are formed on at least a portion of at least one of the first and second substrates in a first region, the first and second substrates being laminated on each other such that the readable pits are located inside,
      a reflective layer formed on the readable pits only in the first region, and
      label information material provided in an area different from the first region;
   a device for reading information from the optical disk; and
   a data decoder for decoding the read information.

17. The optical information reproducing apparatus according to claim 16, wherein the label information material is formed on at least one of the substrates.

18. The optical information reproducing apparatus according to claim 16, wherein the label information material is printed on at least one of the substrates.

19. The optical information reproducing apparatus according to claim 16, wherein the label information is formed on a film and inserted between the first and second substrates.

20. The optical information reproducing apparatus according to claim 16, wherein the label information is printed on a film and inserted between the first and second substrates.

21. The optical information reproducing apparatus according to claim 16, wherein the label information material is located in an annular area radially outward from the first region.

22. The optical information reproducing apparatus according to claim 16, wherein the reflective layer is highly reflective to a light beam for reproducing data and has a low reflectance to other visible light beams.

23. An optical information reproducing apparatus comprising:
- an optical disk comprising:
  - first and second substrates wherein optically readable pits are formed on at least a portion of at least one of the first and second substrates, the first and second substrates being laminated on each other such that the readable pits are located inside,
  - a reflective layer including a translucent film formed on the readable pits, and
  - label information material provided on the translucent film;
- a device for reading information from the optical disk; and
- a data decoder for decoding the read information.

24. The optical information reproducing apparatus according to claim 23, wherein the label information material is formed on the translucent film.

25. The optical information reproducing apparatus according to claim 23, wherein the label information material is print ed on the translucent film.

26. The optical information reproducing apparatus according to claim 23, wherein the label information is formed on the translucent film and inserted between the first and second substrates.

27. The optical information reproducing apparatus according to claim 23, wherein the label information is printed on the translucent film and inserted between the first and second substrates.

28. An optical information reproducing apparatus comprising:
- an optical disk comprising:
  - first and second substrates wherein optically readable pits are formed on at least a portion of at least one of the first and second substrates, the first and second substrates being laminated on each other such that the readable pits are located inside,
  - a reflective layer formed on the readable pits, and
  - label information material formed by a pit pattern or a groove pattern on at least one of the first and second substrates;
- a device for reading information from the optical disk; and
- a data decoder for decoding the read information.

29. The optical information reproducing apparatus according to claim 28, wherein the reflective layer includes a translucent film.

30. The optical information reproducing apparatus according to claim 28, wherein the label information is located in an annular area radially outward from the area in which the readable pits are formed.

\* \* \* \* \*